W. D. MILLER.
Potato-Digger.
No. 55,337. Patented June 5, 1866.
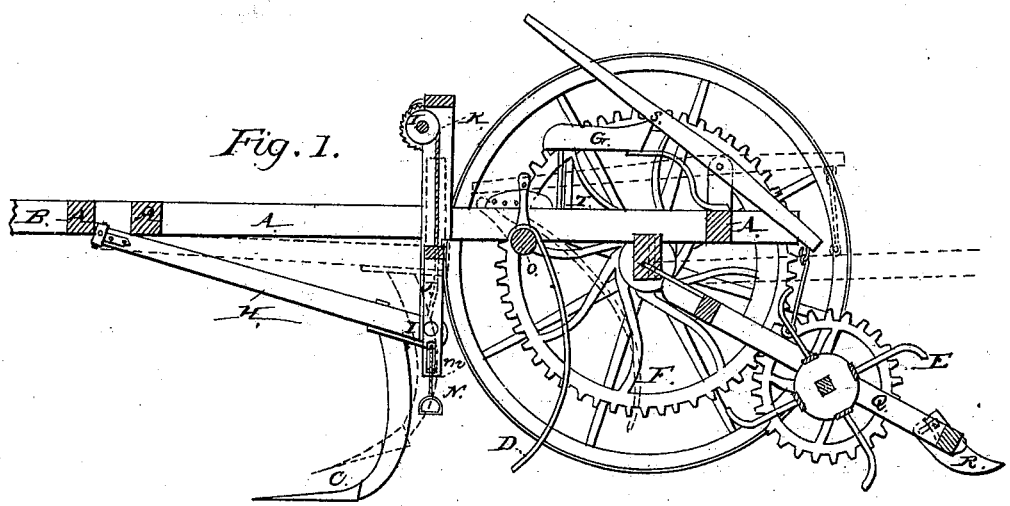
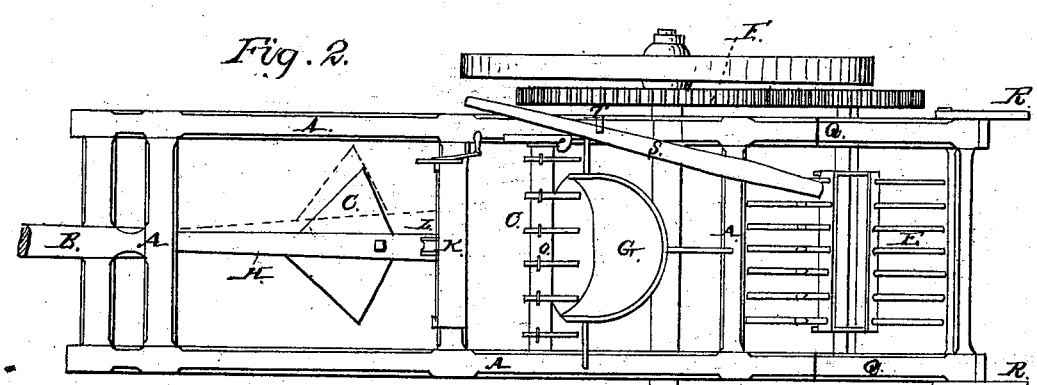
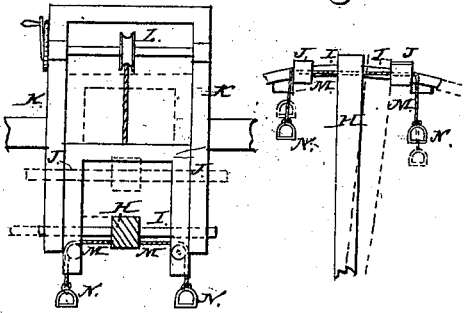
Witnesses:
Andrew Whiteley
James M. Fowler
Inventor:
W. D. Miller
By his atty
A. D. Smith

UNITED STATES PATENT OFFICE.

W. D. MILLER, OF ENON, OHIO.

IMPROVEMENT IN POTATO-DIGGERS.

Specification forming part of Letters Patent No. 55,337, dated June 5, 1866.

*To all whom it may concern:*

Be it known that I, W. D. MILLER, of Enon, in the county of Clarke and State of Ohio, have invented a new and useful Improvement in Potato-Diggers; and I do hereby declare the following to be a full, clear, and exact description of the same, reference being had to the accompanying drawings, in which—

Figure 1 is a side elevation of my machine. Fig. 2 is a plan view of the same. Fig. 3 is a plan, showing the manner of attaching and hanging the plow. Fig. 4 is an elevation, showing the manner of guiding and elevating the plow.

The nature of my invention consists in the combination or arrangement of a plow to loosen the potatoes and the earth around and above them, a rake to remove the vines, and a revolving gatherer to raise the tubers from the hill and deposit them upon the surface of the ground; and it also consists in a novel construction of the various parts of the machine for the purpose of managing and operating these devices.

That others may understand the construction of my machine, I will particularly describe it.

A is the main frame of the machine, to which are attached the tongue B, for drawing it forward, the plow C, and the rake D, and to which is also suspended the gatherer E, when not in operation. The main frame A is supported by two bearing-wheels, to one of which is attached a driving gear-wheel, F. The driver's seat G is also mounted upon the main frame about over the axle of the bearing-wheel.

The plow-beam H is of proper size to possess the requisite strength. It is attached to the front cross-bar of the main frame A by a joint which permits a motion, either vertical or horizontal, on the part of said beam, and at its rear end is the curved cross-head I, which, being curved to the arc of a circle whose center is the center of the joint connecting the plow-beam H to the main frame at its forward end and inserted through two holes in the vertical frame J, serves to retain the plow in its proper vertical position, but permits it to move toward one side or the other, so as to be guided along the center of the row without requiring the main frame to vary in its line of movement for that purpose.

The plow which I prefer to use for this purpose is diamond-shaped, and the share is nearly flat, as it is only desired to break up and loosen without throwing the potatoes out of the hill.

Attached to the main frame A is the vertical frame K, which rises above the main frame and descends below it, as represented. At the top of the frame K is the windlass L, by means of which the frame J and the plow is elevated from the ground at pleasure, the frame J being suspended from the said windlass by a cord or chain. The portions of the frame K which extend below the main frame are cut away on their rear sides so as to conform to the arc of a circle whose center is the center of the connecting-joint between the plow-beam H and the front end of the main frame. This form of the frame K permits the frame J to rise and fall and be constantly confined between the side pieces of K, while the cross-head I is also permitted to project either way, as the plow moves from side to side, without interruption from said frame K.

In order that the plow may be perfectly under control, two pulleys are inserted in the side pieces of the frame J, near their lower ends and over these pulleys cords M extend, which are attached to the plow-beam, and bear at their free ends the stirrups N. In these stirrups the feet of the driver rest, and it is by pressing with one foot or the other that he moves the plow from side to side to make it traverse the center of the row.

A little in rear of the frame K is a transverse shaft, O, having attached to it a number of rake-teeth, which, when desired, sweep the surface of the ground and gather the vines which have just been loosened by the passage of the plow. The shaft O has a rotary motion upon its axis to a limited extent, so that the said teeth may be swung backward and raised from the ground when desired. This movement is accomplished by means of the lever P, and the rake is retained in the desired position by means of a pin inserted in one of a series of holes either before or behind the lever, as may be required; or it may be retained by any other convenient means.

Attached to the axle of the bearing-wheels, in such a manner that it is suspended from the center thereof, is the drag-frame Q, upon which is mounted the revolving gatherer E, constructed with a frame provided with four sets or rows of stout teeth having their outer ends bent in the peculiar manner shown, mounted on a central axis running in bearings on the drag-frame. On the outer end of the gatherer-axle is a pinion which meshes into and is driven by the gear-wheel F.

At the rear ends of the side pieces of the drag-frame Q are the adjustable runners R, which move upon pivots and are provided with clamping devices to hold them at any desired point. The object of the runners R is to support the rear end of the drag-frame Q, so that the depth to which the teeth of the gatherer E enter the ground may be regulated.

The lever S serves to raise the drag-frame Q and its attachments from the ground when going to and from the field, in turning the corners, &c. The spring-catch T serves to hold the lever S, so that the drag-frame may remain suspended without the labor of holding it so.

Operation: The movements and operation of the plow have been fully explained already. It is only designed to loosen up the earth without throwing the tubers upon the surface. The plow may be raised above the ground at pleasure by means of the windlass L and frame J, as heretofore described.

The rake D gathers the vines and weeds, and prevents them from clogging the gatherer. The accumulation of vines, &c., may be released at the end of the row, or oftener, if necessary, by raising the rake from the ground or by any other method.

The teeth of the gatherer penetrate the loosened soil to a point low enough to reach the deepest tuber, and as they revolve in a direction opposite to the movement of the driving-wheel the potatoes are raised from the earth, carried over the axle of the gatherer, and deposited in a mass in the rear. Owing to the fact that these teeth penetrate the ground, it is found that one set does not leave the ground before the next succeeding set has commenced to enter it, so that every portion of the soil traversed is penetrated twice, and no potato not too small to be raised by the gatherer will be omitted.

I have used this gatherer in connection with a receptacle into which the potatoes should be thrown, but the quantity of clods raised and thrown over with the potatoes neutralized any advantage of such a plan. I have therefore found it more satisfactory to deposit the potatoes in little heaps upon the ground, to be picked up and assorted in the usual way.

Having described my invention, what I claim as new, and desire to secure by Letters Patent, is—

1. The combination of a laterally-adjustable mold-plow with the gatherer of a potato-digging machine, substantially as described.

2. The combination of the rake D with the plow and gathering devices of a potato-digging machine, for the purpose of gathering the vines, substantially as set forth.

3. The combination of a mold-plow, a rake, and a revolving fork or gatherer, for the purpose of digging potatoes, and substantially as set forth.

4. In combination with the beam of the plow of a potato-digging machine, the cross-head I, and frames J and K, for the purpose of permitting an adjustment of the plow either vertically or laterally, substantially in the manner set forth.

5. The runners R, in combination with the drag-frame which carries the revolving fork or gatherer of a potato-digging machine.

WM. D. MILLER.

Witnesses:
D. A. HARRISON,
J. H. GILLOT.